(12) United States Patent
Sakuramoto

(10) Patent No.: US 7,072,526 B2
(45) Date of Patent: Jul. 4, 2006

(54) IMAGE PROCESSING APPARATUS, IMAGE PROCESSING METHOD AND RECORDING MEDIUM

(75) Inventor: Yukari Sakuramoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 726 days.

(21) Appl. No.: 09/987,127

(22) Filed: Nov. 13, 2001

(65) Prior Publication Data

US 2002/0085771 A1 Jul. 4, 2002

(30) Foreign Application Priority Data

Nov. 14, 2000 (JP) ........................................ 2000-347177

(51) Int. Cl.
 *G06K 9/20* (2006.01)

(52) U.S. Cl. ................ 382/282; 382/103; 382/115; 382/190; 340/5.52

(58) Field of Classification Search ................ 382/103, 382/115, 117, 118, 190, 282, 170; 340/5.52, 340/5.53; 358/5.38, 453
See application file for complete search history.

(56) References Cited

U.S. PATENT DOCUMENTS

| | | | |
|---|---|---|---|
| 4,975,978 A | | 12/1990 | Ando et al. |
| 4,996,994 A | * | 3/1991 | Steinhauer et al. ......... 600/587 |
| 5,293,427 A | * | 3/1994 | Ueno et al. ................. 382/103 |
| 5,687,306 A | | 11/1997 | Blank et al. |
| 5,781,650 A | * | 7/1998 | Lobo et al. ................. 382/118 |
| 5,801,763 A | | 9/1998 | Suzuki et al. |
| 5,835,616 A | * | 11/1998 | Lobo et al. ................. 382/118 |
| 5,990,901 A | * | 11/1999 | Lawton et al. .............. 345/581 |
| 6,049,674 A | | 4/2000 | Yamamoto et al. |
| 6,697,502 B1 | * | 2/2004 | Luo ........................... 382/115 |
| 6,717,518 B1 | * | 4/2004 | Pirim et al. ................. 340/576 |

FOREIGN PATENT DOCUMENTS

| | | |
|---|---|---|
| CA | 2240745 | 12/1998 |
| JP | 9-27897 | 1/1997 |
| JP | 11-341272 | 12/1999 |
| JP | 2000-242768 | 9/2000 |

* cited by examiner

*Primary Examiner*—Bhavesh M. Mehta
*Assistant Examiner*—Yosef Kassa
(74) *Attorney, Agent, or Firm*—Birch, Stewart, Kolasch & Birch, LLP

(57) ABSTRACT

The present invention provides an image processing apparatus, an image processing method and a recording medium for positioning a facial region at a predetermined position in a trimming region at a predetermined size ratio. A position of a top-of-head portion of a person in an image is detected. A vertical direction position of a chin of the person is estimated. A vertical direction position and a size of the trimming region is designated such that a vertical direction size ratio of an overhead region/the facial region/an under-jaw region is a predetermined ratio determined for each type of ID photo. A horizontal direction position and the size of the trimming region are designated such that the aspect ratio of the trimming region coincides an aspect ratio corresponding to the type of identification. The designated trimming region is overlayed on the image and displayed.

20 Claims, 11 Drawing Sheets

TOP-OF-HEAD POINT CANDIDATES

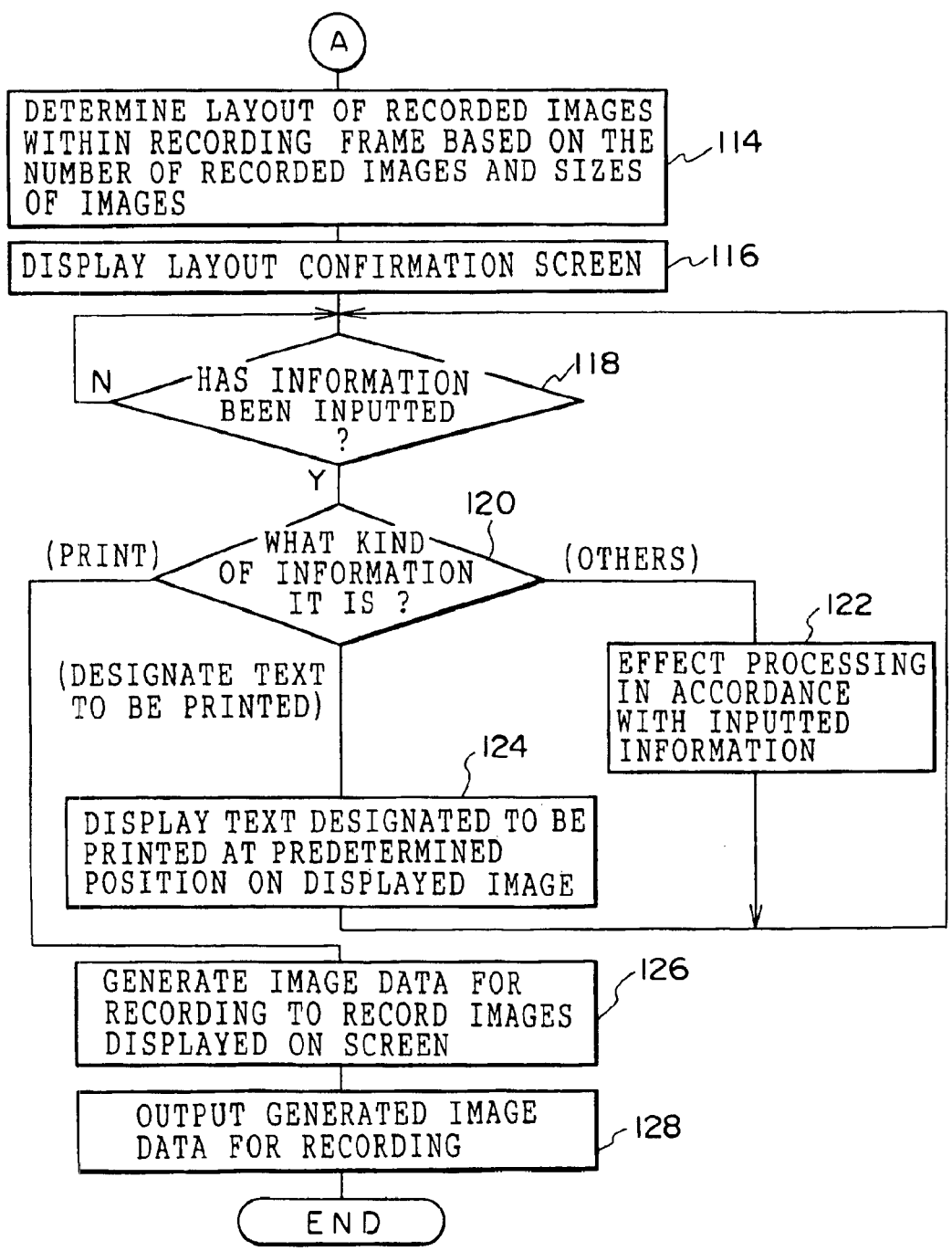

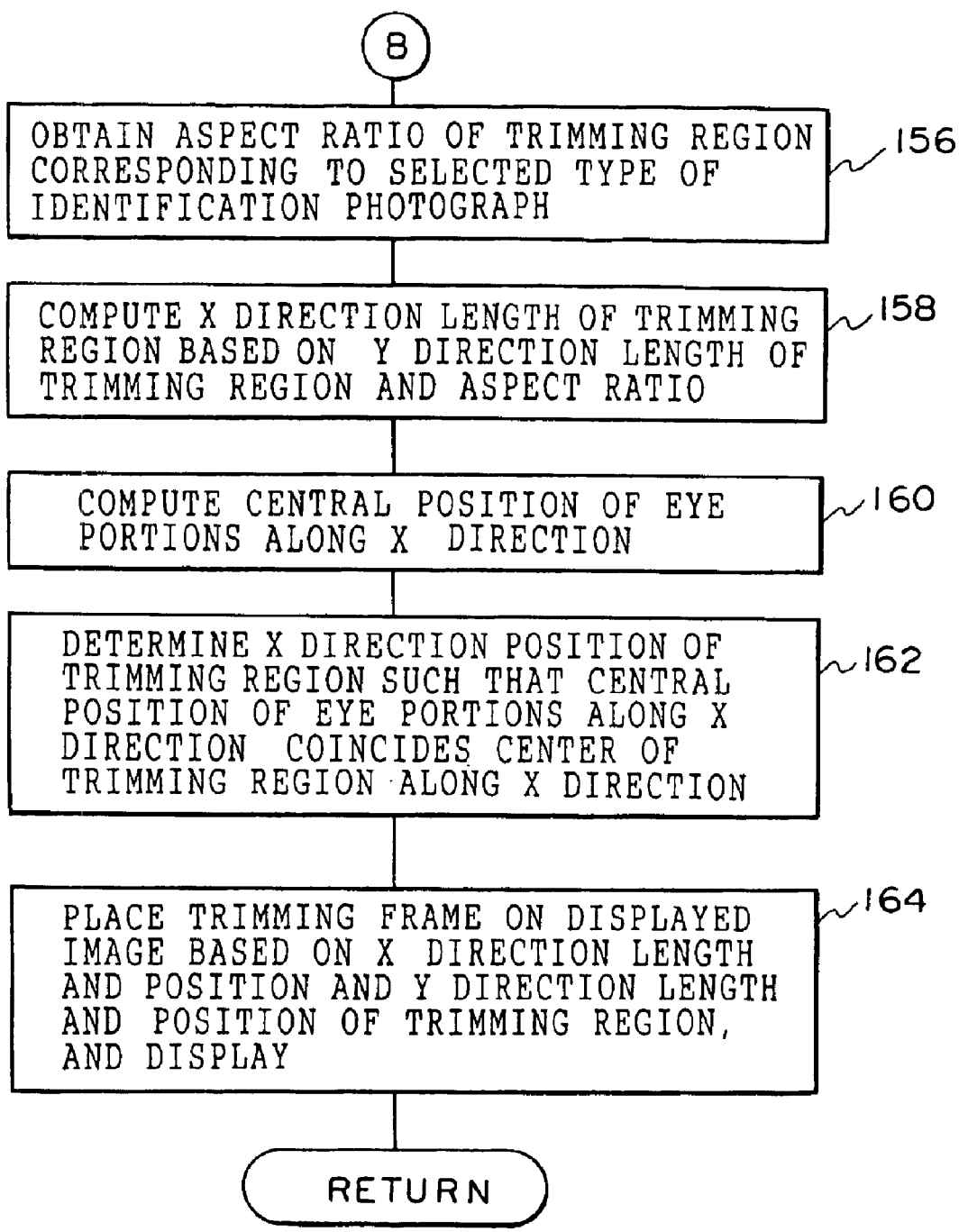

FIG.6A
TOP-OF-HEAD POINT
FIG.6B
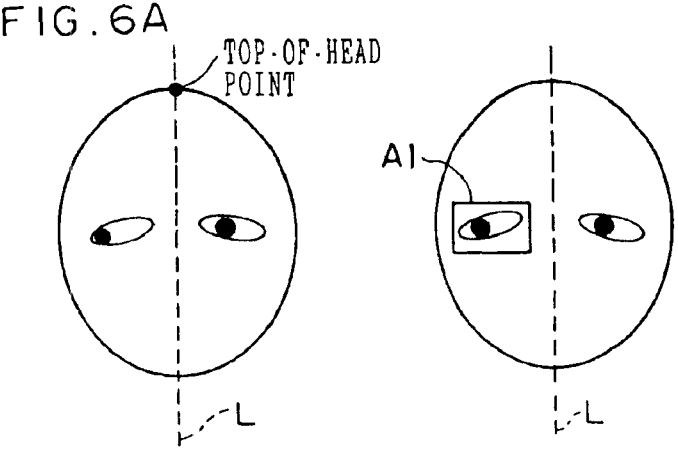
FIG.6C
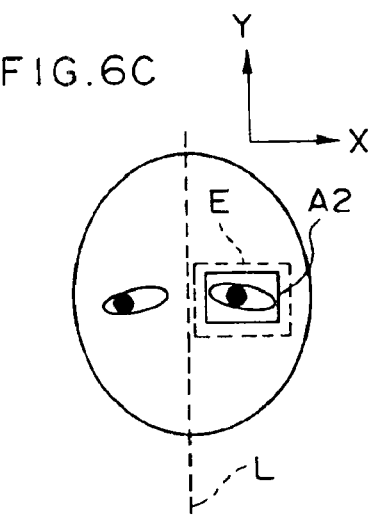
FIG.6D
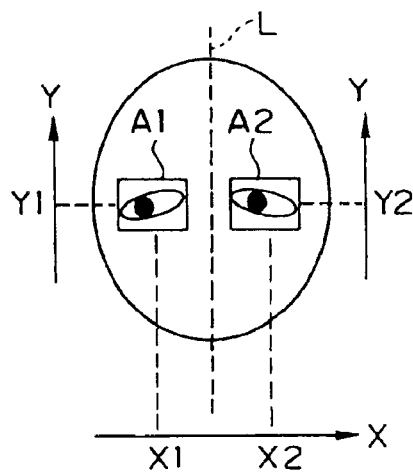
FIG.6E
|  | BRIGHT |  |  |
|---|---|---|---|
| BRIGHT | DARK | BRIGHT | BRIGHT |
|  | BRIGHT |  |  |
FIG.6F
|  |  | BRIGHT |  |
|---|---|---|---|
| BRIGHT | BRIGHT | DARK | BRIGHT |
|  |  | BRIGHT |  |
FIG.6G
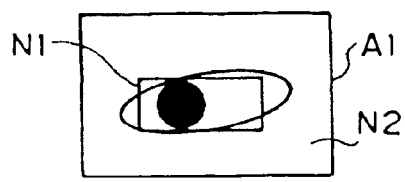
FIG.6H
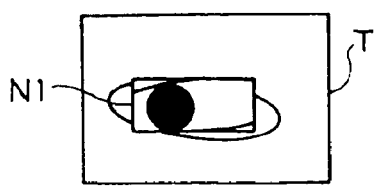

F I G . 7
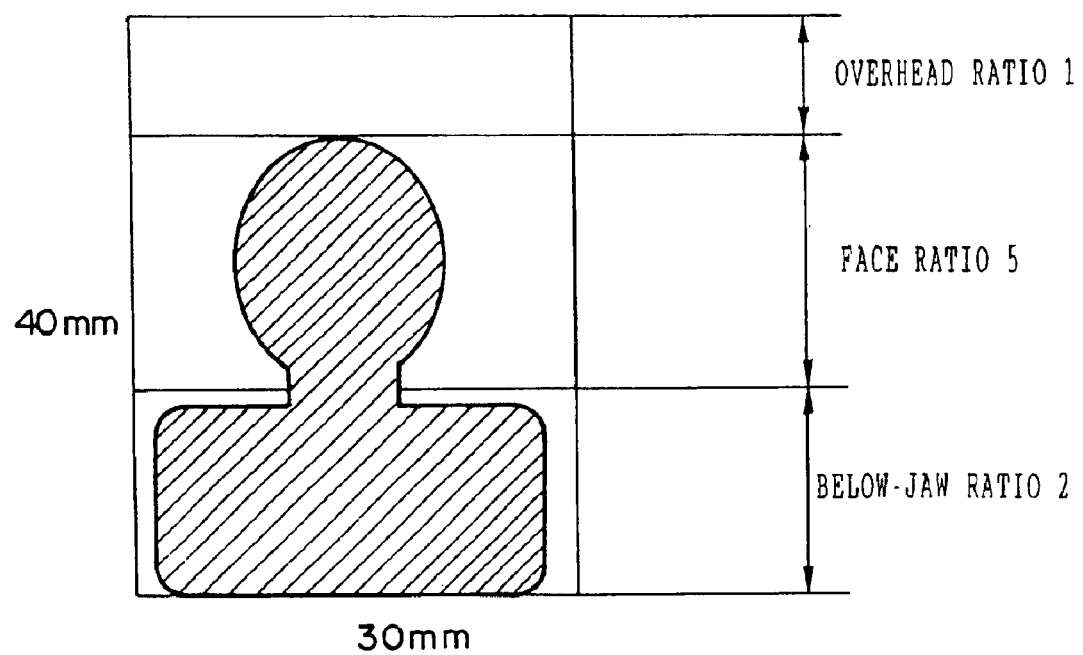

FIG. 8

LAYOUT — 72A

IDENTIFICATION PHOTOGRAPH SIZE — 72B
⦿ JUST SIZE   ○ A LITTLE LARGER   ○ LARGER

DISTANCE BETWEEN IDENTIFICATION PHOTOGRAPHS — 72C
⦿ 1mm   ○ 3mm   ○ 5mm

SECTION — 72D
☐ SELECTED IMAGE   ☐ SIZE   ☐ COLOR

PRINT — 72E
☑ DATE   ☑ SIZE   ☑ COMMENT

24×30
35×45

PRINT SIZE: 89 × 127mm   RESOLUTION: 300 dpi   PAGE: 1/1
2000.11.06 DSC ID PHOTO

[PREVIOUS PAGE] [NEXT PAGE] [CLEAR] [CANCEL]
[CONTINUE] [STOP] [PRINT] — 72F

IMAGE PROCESSING APPARATUS, IMAGE PROCESSING METHOD AND RECORDING MEDIUM

BACKGROUND OF THE INVENTION

1. Field of the Invention

The present invention relates to an image processing apparatus, an image processing method and a recording medium. In particular, the present invention relates to an image processing apparatus which sets a trimming region wherein a facial region corresponding to a face of a person in an original image is positioned at an appropriate position with an appropriate size ratio, an image processing method which can apply to the image processing apparatus, and a recording medium in which a program for functioning a computer as the image processing apparatus is recorded.

2. Description of the Related Art

Currently, there are many opportunities for attaching or submitting a photograph (for identification) with a person's face thereon having a predetermined size, e.g., in cases of applying an issue of a passport or a driver's license or of making a person's personal history. Thus, devices for automatically preparing ID photo have been conventionally utilized in which a photobooth for shooting a user is provided, a user sitting on a chair within the photobooth is shot, and a single photosheet with a plurality of images of the user for ID photo recorded thereon is automatically prepared.

The size of ID photos can vary depending on for what the ID photo is used. For example, a size of the ID photo for passports is 35 mm×45 mm, and a size of the ID photo for general use is 30 mm×40 mm. Japanese Patent Application Laid-Open (JP-A) No. 9-27897 proposes that cut marks are recorded on an ID photo sheet in order to cut an ID photo with a desired size from the identification sheet in the above-described device. However, as apparent from FIG. 1 of JP-A No. 9-27897, there are drawbacks that the device for automatically preparing an ID photo is extremely large and places the device is to be disposed are limited. Further, there is a problem that in order for a user to obtain an ID photo, a user has to look for a place that the device for automatically preparing ID photos is disposed, and a user has to go to the found place, which places a burden on the user.

Recently, there has been generally used an image processing system in which various image processings are effected for image data obtained by reading film images recorded on a photographic film or image data inputted from a digital camera or the like, and then images are recorded on a recording material such as a photographic printing paper or the like, or images can be outputted from other output devices. (e.g., image data is stored in an information recording medium such as a smart media or the like.)

As a technology which can be applied to such type of the image processing system, JP-A No. 11-341272 has proposed that a series of processings are effected automatically that when two positions (positions of top-of-head and of chin) of a face in a displayed image is designated with an image for preparing an ID photo (image with a person's face shot thereon) being displayed on a display device, a computer computes an enlargement/reduction ratio of the face and the position of the face based on the designated two positions, the enlarged/reduced image is subjected to trimming such that the enlarged/reduced face in the image is positioned at a predetermined position in a screen of the ID photo, and then an image for the ID photo is formed.

In accordance with the above-described technology, a user can ask for preparation of an ID photo to DPE shops which exist more than devices for automatically preparing ID photo. Further, if a user brings, among photographs that a user possesses, a photographic film or an information recording medium with photographs that a user likes because of being well taken recorded therein to a DPE shop, an ID photo can be prepared from the photographs that the user prefers.

However, in the technology disclosed in JP-A No. 11-341272, an operator must effect a complicated operation of designating the positions of top-of-head point and of chin in the original image displayed on the display device. Thus, there is a problem that a large amount of burden is placed on an operator when ID photos of a large number of users are prepared successively. When an area corresponding to the face of the person in the displayed image is extremely small, or when resolution of an image is rough, it is difficult for an operator to designate the positions of the top-of-head point and of the chin rapidly and accurately, which hinder rapid preparation of ID photos.

SUMMARY OF THE INVENTION

The present invention was developed in light of the above circumstances, and an object of the present invention is to provide an image processing apparatus which can lighten a burden for an operator when a trimming region is set such that a facial region corresponding to a face of a person is positioned at a predetermined position in the trimming region with a predetermined size ratio.

The present inventors have found that, in order to lighten a burden for an operator when a trimming region is set such that a facial region corresponding to a face of a person is positioned at a predetermined position with a predetermined size ratio, a facial region which exists in the original image where the trimming region is to be set is automatically identified, and the trimming region is automatically set in accordance with the position and the size of the identified facial region.

There have been conventionally proposed various methods for detecting a facial region in an image. The present inventors studies a detecting method appropriate for an automatic setting of the trimming region and effect experiments. As a result, the present inventors have found that if it is presupposed that the trimming region is automatically set, although the position and the size of the facial region need to be detected with relatively high precision, an entire facial region is not necessarily detected precisely (i.e., it is not necessary to identify all boundary positions of the facial region). Further, the present inventors arrived at the present invention by discovering that if detections of a top-of-head portion (i.e., crown) and of eye portions which are effected with relatively high precision are selected from the various methods for detecting partially the facial region and combined, the position and the size of the facial region can be detected with relatively high precision.

According to one aspect of this invention, there is provided an image processing apparatus comprising of detector for detecting, on the basis of image data of an original image including image data of a facial region in which a face of a person is stored, a position corresponding to a top-of-head portion and positions corresponding to eye portions of the person in the original image; and component for setting, on the basis of the detected position corresponding to the top-of-head portion and the positions corresponding to the eye portions of the person in the original image, a trimming region corresponding to the original image such that the facial region is positioned at a predetermined position within the trimming region at a predetermined size ratio.

According to another aspect of this invention, on the basis of the image data of the original image including the facial region, the position corresponding to the top-of-head portion and the positions corresponding to the eye portions of the person in the original image are detected by the detector. In order to detect the position corresponding to the top-of-head portion of the person in the original image, it is appropriate to use an algorithm. In the algorithm, the original image is scanned from the vertical direction upper side to the vertical direction lower side, and a density variation amount is computed repeatedly on a plurality of positions thereon along a horizontal direction perpendicular to the vertical direction of a subject. Then, a position at which the density variation amount exceeds firstly a predetermined value is stored as a proposed top-of-head portion. The proposed top-of-head portion, positioned at the most highest position in a portion included a large number of proposed top-of-head portions along the vertical direction, is detected as the position corresponding to the top-of-head portion. Other algorithms may be used.

In order to detect the positions corresponding to the eye portions of the person in the original by the detector, for example, it is appropriate to use an algorithm as disclosed in JP-A No. 2000-242768. In the algorithm, a filtering processing is effected by using a filter for detecting bright/dark patterns corresponding to the eye portions. Then, a predetermined region including a region corresponding to one eye portion is designated, and a specific region including a pupil portion at a center of the designated predetermined region is designated. The region other than the specific region in the predetermined region is reversed with respect to an axis parallel to the vertical direction of the subject in the original image being a linear symmetrical axis, and the reversed region is composited with the specific region. As a result, a template is formed. The template is scanned within a search area where there is assumed to exist a region corresponding to the other eye portion and a correlation coefficient is computed. In this way, a predetermined region including the region corresponding to the other eye portion is designated. Other algorithms may be used.

Comparing to algorithms for detecting boundary positions of a facial region, algorithms for detecting the position corresponding to the top-of-head portion of the person and algorithms for detecting the positions corresponding to the eye portions of the person have simple processings and high detection precision. Thus, detection by the detector can be effected in a short image and with high precision.

The component for setting of the present invention sets the trimming region of the original image on the basis of the position corresponding to the top-of-head portion and the positions corresponding to the eye portions of the person in the original image detected by the detector such that the facial region is positioned at a predetermined position of the trimming region with a predetermined size ratio. As described above, the present inventors confirm by experiments, that if the position corresponding to the top-of-head portion and the positions corresponding to the eye portions of the person in the original image are detected with high precision, the position and the size of the facial region in the original image can be recognized relatively high precision on the basis of these positions. Thus, the component for setting can set appropriately the trimming region of the trimming region such that the facial region is positioned at a predetermined position in the trimming region with a predetermined size ratio.

According to still another aspect of this invention, since the trimming region on which the facial region is positioned at a predetermined with a predetermined size ratio can be set automatically without an operator, a burden for an operator is lightened when the trimming region is set such that the facial region is positioned at a predetermined position in the trimming region with a predetermined size ratio.

The trimming region along the vertical direction of the subject in the original image is set as follows. The storage stores an appropriate value of a size ratio along the vertical direction of an overhead region which exists, in the trimming region, further upwards than the facial region long the vertical direction of a subject in the original image, the facial region and an under-jaw region which exists, in the trimming region, further downwards than the facial region along the vertical direction. The component for setting assumes, on the basis of the detected position corresponding to the top-of-head portion and the positions corresponding to the eye portions of the person in the original image, a position corresponding to a chin of the person, and, on the basis of a distance on the original image between the position corresponding to the top-of-head portion and the position corresponding to the chin, sets a position and a size of the trimming region along the vertical direction such that the size ratio along the vertical direction of the overhead region, the facial region and the under-jaw region in the trimming region coincides an appropriate value of the size ratio stored in the storage.

According to still another aspect of this invention, since the position of the trimming region along the vertical direction is set such that the size ratio along the vertical direction of the overhead region, the facial region and the under-jaw region in the trimming region coincides an appropriate value of the size ratio stored in the storage, with respect to the vertical direction of the subject, the position and the size of the trimming region can be set such that the facial region is positioned at a predetermined position in the trimming region with a predetermined size ratio.

The present inventors confirm by experiments that the position corresponding to the chin of the person in the original image cannot be detected with high precision by conventional detecting methods, and that the position corresponding to the chin can be assumed with relatively high precision from the position corresponding to the top-of-head portion and the positions corresponding to the eye portions of the person in the original image. In accordance with the present invention, as the position corresponding to the chin of the person in the original image is assumed from the position corresponding to the top-of-head portion and the positions corresponding to the eye portions of the person in the original image, it is possible to avoid inappropriate position and size of the trimming region set by the component for setting due to misdetection of the position corresponding to the chin of the person in the original image.

Setting of the trimming region along a horizontal direction perpendicular to the vertical direction of the subject can be accomplished as follows. The detector detects positions corresponding to the eye portions of the person in the original image. The storage stores information which indicates an aspect ratio of the trimming region (e.g., information which indicates an aspect ratio itself or information which indicates vertical and horizontal direction sizes of an recorded image for recording an image region corresponding to the trimming region onto a recording material). The component for setting sets a position corresponding to a substantial center along the horizontal direction in the positions corresponding to the eye portions as a central position of the trimming region along the horizontal direction, and on the basis of the size of the trimming region along the vertical direction, the component for setting sets a position and a size of the trimming region along the horizontal direction such that the aspect ratio of the trimming region coincides the aspect ratio indicated by the information stored in the storage.

According to still another aspect of this invention, the position corresponding to a substantial center along the horizontal direction perpendicular to the vertical direction in the positions corresponding to the eye portions is set as a central position of the trimming region along the horizontal direction, and on the basis of the size of the trimming region along the vertical direction, the position and the size of the trimming region along the horizontal direction is set such that the aspect ratio of the trimming region coincides the aspect ratio indicated by the information stored in the storage. Thus, the position and the size of the trimming region along the horizontal direction can be set such that the facial region is positioned at a desirable position along the horizontal direction of the subject, i.e., at a substantial center in the trimming region along the horizontal direction.

According to still another aspect of this invention, preferably, a plurality of kinds of print sizes are prepared as sizes(print sizes) of a recorded image for recording an image region corresponding to the set trimming region in the original image onto a recording material. A desirable position and size ratio of the facial region in the trimming region or an aspect ratio may be different for each print size. Taking consideration in such circumstances, preferably, a selector for selecting a desired print size among a plurality of kinds of print sizes is provided. Further, it is preferable that the storage stores information which indicates an appropriate value of the size ratio and an aspect ratio of the trimming region in correspondence to each of the plurality of kinds of print sizes, and the component for setting sets the position and the size of the trimming region by using the information which indicates the appropriate value of the size ratio and the aspect ratio and is stored in correspondence to a print size selected by the selector.

Accordingly, even if any of the prints sizes is selected by the selector, the aspect ratio of the trimming region can be made to coincide an aspect ratio corresponding to the selected print size. Further, the size ratio of the facial region along the vertical direction of the subject may be an appropriate size ratio corresponding to the print size. The position of the facial region along the vertical direction of the subject can be an appropriate position corresponding to the print size.

Even if the present invention is applied, there may be a case in which the trimming region cannot be set appropriately because of, for example, a hair style of the person (e.g., a case in which a size along the vertical direction of an area corresponding to a hair portion of the person is extremely large). Thus, a display controller for placing the trimming region set by the component for setting on the original image and displaying the trimming region on a display, and a corrector for correcting at least one of the position and the size of the trimming region set by the component for setting are preferably provided. When correction of at least one of the position and the size of the trimming region is instructed by the corrector, in accordance with the instruction, it is preferable that the component for setting corrects at least one of the position and the size of the trimming region.

According to still another aspect of this invention, since the trimming region is placed on the original image and then displayed on the display, an operator can visually check whether or not the trimming region set by the component for setting is appropriate. The trimming region may be displayed such that lines indicating an outer edge of the trimming region is displayed, or may be displayed such that portions outside the trimming region are displayed differently from portions within the trimming region (e.g., the portions outside the trimming region are displayed in monochrome.).

If correction of at least one of the position and the size of the trimming region is instructed, the component for setting relating to the present invention corrects the trimming region in accordance with the instruction. Thus, the trimming region can be corrected such that the position and the size thereof are appropriate with respect to an original image that an appropriate trimming region is difficult to be set automatically from the position corresponding to the top-of-head portion and the positions corresponding to the eye portions of the person in the original image.

If correction of at least one of the position and the size of the trimming region is instructed, the display controller preferably corrects a display of the trimming region or a display of the original image based on the trimming region corrected by the component for setting. Thus, an operator can confirm results of instruction of correction of at least one of the position and the size of the trimming region.

The image processing apparatus relating to the present invention may provide recorder for recording an image region corresponding to the trimming region in the original image set by the component for setting onto a recording material as an image. In this case, a designator for designating text information to be recorded on a recording material is provided. Preferably, the recorder records the text information designated by the designator on the same recording material. As the text information, information which indicates at least one of types of recorded images and print sizes with text may be used. Since the text information is recorded on a recording material, classification of images recorded on the recording material by the recorder is handled easily.

According to still another aspect of this invention, there is provided an image processing method comprising the steps of: (a) detecting, on the basis of image data of an original image including image data of a facial region which stores a face of a person, a position corresponding to a top-of-head portion and positions corresponding to eye portions of the person in the original image; and (b) setting, on the basis of the detected position corresponding to the top-of-head portion and the positions corresponding to the eye portions of the person in the original image, a trimming region of the original image such that the facial region is positioned at a predetermined position of the trimming region at a predetermined size ratio. In accordance with the present invention, a burden for an operator can be lightened when the trimming region is set such that the facial region corresponding to the face of the person is positioned at a predetermined position in the trimming region with a predetermined size ratio.

According to still another aspect of this invention, there is provided the image processing method, further comprising the step of: (c) storing an appropriate value of a size ratio along a vertical direction of an overhead region which exists, in the trimming region, further upwards than the facial region along the vertical direction of a subject in the original image, the facial region and an under-jaw region which exists, in the trimming region, further downwards along the vertical direction than the facial region, wherein in the step (b), on the basis of the detected position corresponding to the top-of-head portion and the positions corresponding to the eye portions of the person in the original image, a position corresponding to a chin of the person in the original image is assumed, and on the basis of the distance on the original image between the position corresponding to the top-of-head portion and the position corresponding to the chin, the position and the size of the trimming region along the vertical direction is set such that the size ratio along the vertical direction of the overhead region, the facial region and the under-jaw region in the trimming region coincides the appropriate value of the size ratio stored in the step (c).

The recording medium of the present invention records processing including the steps (a) and (b), i.e., a program for functioning a computer as the image processing apparatus of the present invention. Thus, by the computer reading out the program recorded in the recording medium and implementing the program, burden for an operator can be lightened when the trimming region is set such that the facial region corresponding to the face of the person is positioned at a predetermined position in the trimming region with a predetermined size ratio.

BRIEF DESCRIPTION OF THE DRAWINGS

FIG. 2A and FIG. 2B are flowcharts showing the contents of an ID photo preparation processing.

FIG. 3A and FIG. 3B are flowcharts showing the contents of a processing for automatically designating a trimming region.

FIG. 6A through FIG. 6H are conceptional views for describing detection of both eyes portions.

FIG. 7 is an imaginary view for describing a ratio of overhead/face/below-jaw.

FIG. 8 is an imaginary view showing an example of a layout confirmation screen.

DESCRIPTION OF THE PREFERRED EMBODIMENTS

Figure 1:
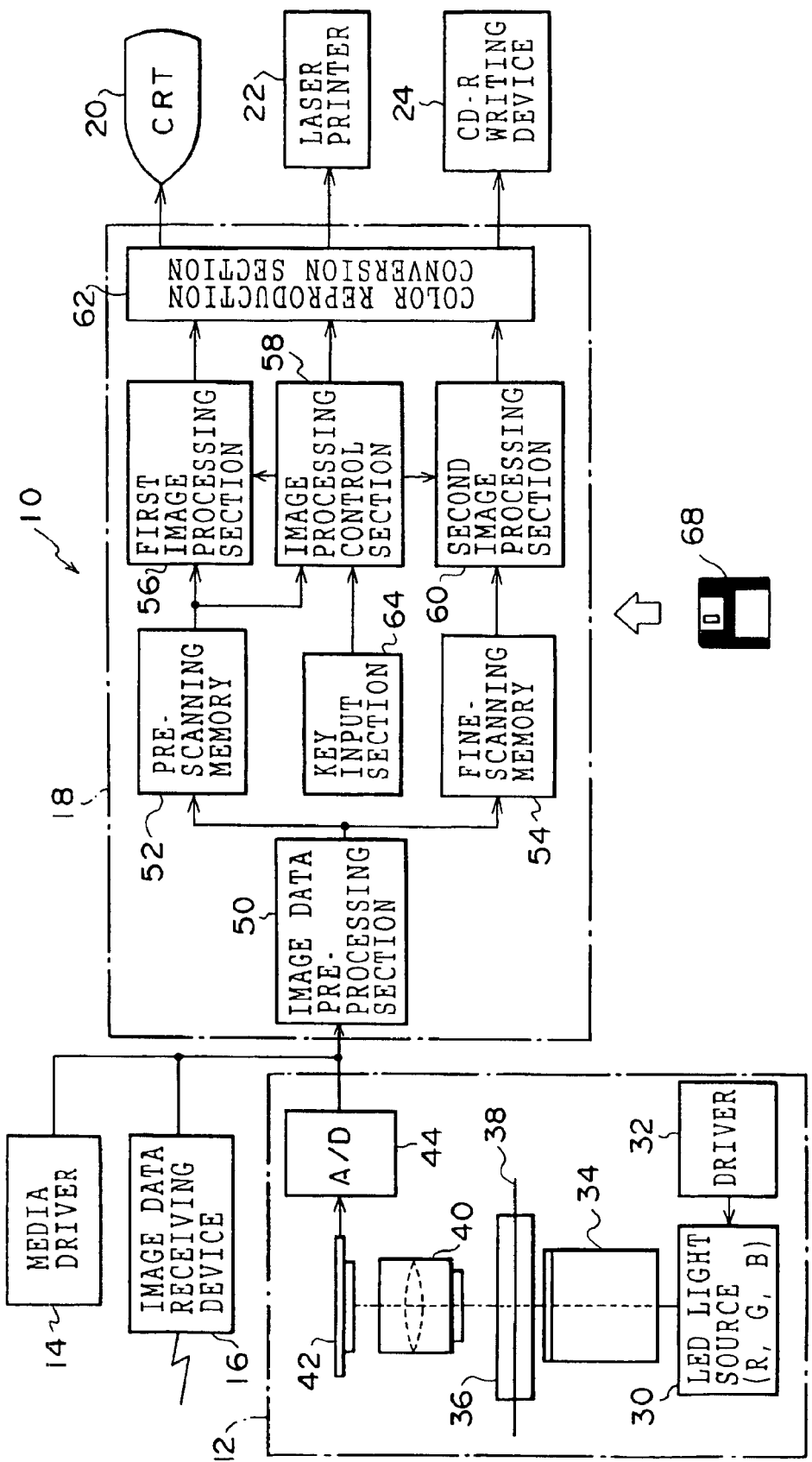
FIG. 1 is a block diagram showing a schematic structure of an image processing system.

One embodiment of the present invention will be described hereinafter in detail with reference to the drawings. FIG. 1 shows a schematic structure of an image processing apparatus 10 relating to the present embodiment. The image processing apparatus 10 includes, as an input device for inputting image data, a film scanner 12, a media driver 14 and an image data receiving device 16. Further, the image processing apparatus 10 is provided with an image processing device 18 for processing the image data inputted from the input device. The image processing apparatus 10 includes, as an output device for outputting the image data subjected to processing effected by the image processing device 18, a CRT 20, a laser printer 22 for exposing and recording an image onto a photographic printing paper and a CD-R writing device 24 for writing the image data into a CD-R.

Any of various image storage mediums including a magnetic disk such as a floppy disk (FD), an optical disk such as a CD-R, an magneto-optical disk (MO), a PC card or a smart media which can be loaded into a digital still camera (DSC), and an IC card (which will be referred to as "digital camera card" hereinafter) is set in the media driver 14. The media driver 14 reads out image data stored in the set information storage medium and outputs the image data. The image data receiving device 16 is connected to a computer network such as an Internet. Thus, the image data receiving device 16 receives R, G, B image data from an information processing device (for example, a personal computer (PC)) via a computer network and outputs the received image data.

The film scanner 12 reads a film image (a negative film or a positive image which becomes visible by being subjected to development processing after a subject is photographed: which corresponds to an original image of the present invention) recorded on a photographic photosensitive material (hereinafter, simply referred to as "photographic film") such as a photographic film 38 (e.g., a negative film or a reversal film). The film scanner 12 outputs the image data obtained by reading. Light, which has been emitted from an LED light source 30 and whose non-uniformity of the light amount has been reduced by a light diffusion box 34, is irradiated onto the photographic film 38 set at a film carrier 36. The light which has passed through the photographic film 38 is focused onto a light receiving surface of an area CCD sensor 42 (or a line CCD sensor) via an optical lens 40.

The film carrier 36 conveys the photographic film 38 intermittently such that film images are successively positioned on an optical axis of the light emitted from the LED light source 30. The LED light source 30 is formed by arranging, with constant and high density, a large number of LEDs for emitting R, G, B lights on an entire surface of an unillustrated substrate. The LED light source 30 is driven by a driver 32 so as to emit R, G, B lights in that order onto a single image at a reading position. Accordingly, film images recorded on the photographic film 38 are read in order by the CCD sensor 42, and R, G, B signals corresponds to the film images are outputted from the CCD sensor 42. The signals outputted from the CCD sensor 42 are converted into digital image data by an A/D converter 44, and are inputted to the image processing device 18.

As shown in FIG. 1, the above-described film scanner 12, the media driver 14 and the image data receiving device 16 are connected to an image data pre-processing section 50 of the image processing device 18. Image data outputted from these image data input devices is inputted to the image data pre-processing section 50.

The image data pre-processing section 50 carries out predetermined pre-processings which are different in accordance with the section to which the image data has been inputted. As a pre-processing upon image data inputted from the film scanner 12, for example, dark correction, density conversion, shading correction and defective pixel correction are included. As a pre-processing upon image data inputted from the media driver 14, decompression of image data compressed and recorded in an information storage medium, and improvement in sharpness are included. As a pre-processing upon image data inputted from the image data receiving device 16, decompression of compressed image data (e.g., image data with JPEG format) received by the image data receiving device 16 is included.

The film scanner 12 relating to the present embodiment carries out reading twice for each film image recorded on the photographic film at different resolutions. In the first reading which is carried out at a relatively low resolution (hereinafter, which will be referred to as a pre-scanning), even in cases in which a density of the film image is extremely low (e.g., an underexposed negative image on a negative film), reading of the film image is carried out under reading conditions determined such that troubles such as saturation of accumulated charges does not occur.

Connected to the image data pre-processing section 50 are a pre-scanning memory 52 and a fine-scanning memory 54. A first image processing section 56 and an image processing control section 58 are connected to the pre-scanning memory 52. A second image processing section 60 is connected to the fine-scanning memory 54. The image data pre-processing section 50 carries out a predetermined pre-processing for the image data having a relatively low resolution inputted from the film scanner 12 by the pre-scanning being effected, and then outputs the processed data to the pre-scanning memory 52.

The image data pre-processing section 50 outputs the image data inputted from the media driver 14 and the image data inputted from the image data receiving device 16 to the pre-scanning memory 52 and to the fine-scanning memory 54, respectively. The image data to be outputted to the pre-scanning memory 52 is converted into image data having a resolution as low as that of the image data obtained by the pre-scanning. Then, the low-resolution image data is outputted to the pre-scanning memory 52. The low-resolution image data outputted to the pre-scanning memory 52 is inputted to the image processing control section 58 via the pre-scanning memory 52.

In the image processing control section 58 and the first image processing section 56, a CPU, a ROM, a RAM and an input/output port are connected together via busses. The image processing control section 58 and the first image processing section 56 can be accomplished by a single image processing PC having a structure in which a storage device such as a hard disk device (such as a HDD) is connected to the input/output port. By the image processing PC effecting a predetermined program, the image processing PC can function as the first image processing section 56 and the image processing control section 58.

If the low-resolution image data inputted to the image processing control section 58 via the pre-scanning memory 52 is the image data obtained by effecting a pre-scanning at the film scanner 12, the image processing control section 58 computes an amount of image characteristics such as a density and the like based on the low-resolution image data, determines reading conditions at the time that the film scanner 12 reads again the photographic film subjected to the pre-scanning at a relatively high resolution (hereinafter, a fine-scanning) and outputs the determined reading conditions to the film scanner 12.

The image processing control section 58 automatically determines (set-up computation), by computation, processing conditions of various image processings effected by the second image processing section 60 for the high-resolution image data (the image data inputted from the film scanner 12 by the film scanner 12 effecting a fine-scanning or the image data inputted from the media driver 14 or the image data inputted from the image data receiving device 16) outputted from the image data pre-processing section 50 to the second image processing section 60 via the fine-scanning memory 54, on the basis of the inputted low-resolution image data, and notifies the determined processing conditions to the first image processing section 56.

As the image processings effected in the second image processing section 60, image processings for improvement in quality of output images such as, for example, gray valance adjustment of images, density adjustment, gradation control, hypertone processing for compressing the gradation of the extremely low frequency luminance components of the images, and hypersharpness processing for enhancing the sharpness while suppressing graininess are included. Further, image processings for intentionally changing the atmosphere of the image (image processing for imparting a portrait finish to the output image and the like), image processing for manipulating the image (image processing for making a person in the original image thinner on the main image and the like) can be carried out.

The first image processing section 56 carries out, on the basis of the processing conditions informed by the image processing control section 58, image processing which is equivalent to the image processing effected in the second image processing section 60 with respect to the high-resolution image data, for the low-resolution image data stored in the pre-scanning memory 52, and generates simulation image data. A color reproduction conversion section 62 and a CRT 20 are connected in that order to the first image processing section 56. The CRT 20 has a buffer for storing inputted image data, generates an analog electrical signal based on the image data stored in the buffer, and displays the image represented by the image data. The simulation image data generated in the first image processing section 56 is outputted to the color reproduction conversion section 62 and is subjected to color reproduction conversion processings such as density conversion and the like. Then, the processed simulation image data is outputted and displayed on the CRT 20 as a simulation image (output image). The output image displayed on the CRT 20 is tested with respect to its finish or the like by an operator.

A key input section 64 is connected to the image processing control section 58. The key input section 64 may be formed by, for example, a keyboard and a mouse (which are connected to the aforementioned input/output port for image processing). An operator tests the output image displayed on the CRT 20, operates the key input section 64 and inputs results of the test. Then, if the processing conditions are determined by the test effected by the operator, the image processing control section 58 notifies the determined processing conditions to the second image processing section 60.

The second image processing section 60 includes plural kinds of image processing circuits for carrying out the above-described various image processings. If the high-resolution image data is inputted from the image data pre-processing section 50 via the fine-scanning memory 54, the second image processing section 60 carries out various image processings for the inputted high-resolution image data in accordance with the processing conditions inputted from the image processing control section 58. The second image processing section 60 is connected to the color reproduction conversion section 62. The image data outputted from the second image processing section 60 is subjected to the color reproduction conversion processing in the color reproduction conversion section 62 and outputted to a laser printer 22 or a CD-R writing device 24. Then, the image data is used to record an image onto a photographic printing paper by the laser printer 22 or is written in a CD-R by the CD-R writing device 24.

The laser printer 22 has R, G, B light sources. At the laser printer 22, R, G, B lights emitted from the laser light source are modulated based on the image data inputted from the image processing device 18 and are scanned on a photographic printing paper while being deflected by deflecting means such as a polygon mirror or the like. As a result, the photographic printing paper is exposed and an image is recorded thereon. The photographic printing paper with an image recorded thereon is sent to a paper processor and is subjected to the respective processings including color development, bleaching/fixing, washing and drying. In this way, the image which is recorded on the photographic printing paper is made visible.

Next, a description will be given of preparing an ID photo as an operation of the present embodiment. An ID photo is prepared when a user brings a photographic film with an image to prepare an ID photo recorded therein or an information recording medium such as a smart media or the like in which image data of an image to prepare an ID photo to a DPE shop and asks an operator to prepare the ID photo. When the ID photo is prepared, conditions including types of the ID photo to be prepared, the number of photographs for each type (color/monochrome) is designated. A user can ask the operator to prepare the ID photo on line. The data for the image to prepare the ID photo can be received by an on-line.

Figure 2A:
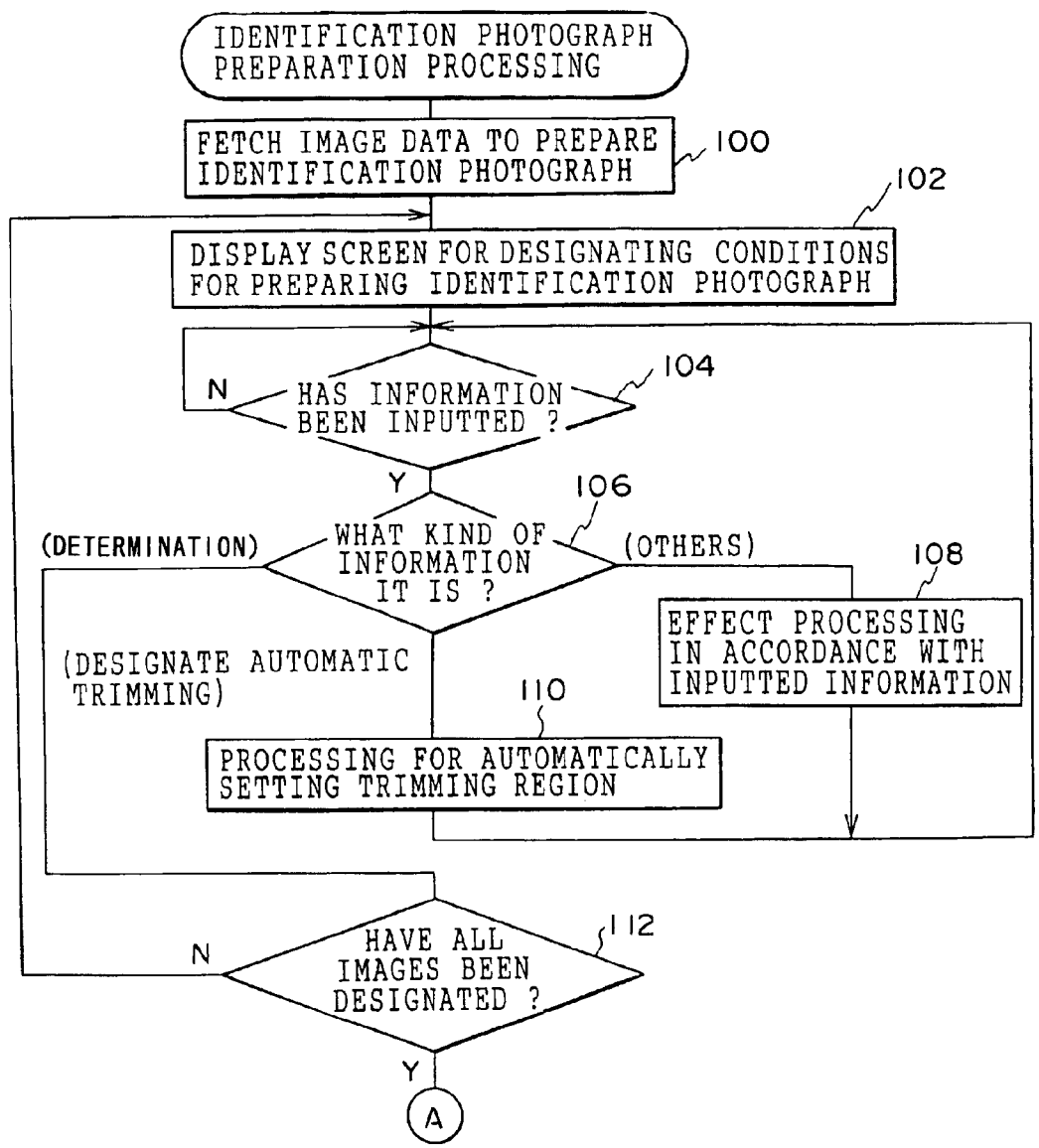

When an operator is asked to prepare the ID photo, the operator designates preparation of the ID photo in a state in which high-resolution image data of the image to prepare the ID photo is stored in the fine-scanning memory 54 by the film scanner 12 carrying out a fine-scanning for the image to prepare the ID photo recorded in the photographic 38 which has been brought by a user or by reading out the image data of the image to prepare the ID photo. A description will be given hereinafter with reference to flowcharts of FIG. 2A and FIG. 2B of a processing for preparing an ID photo executed in the image processing control section 58 in accordance with the designation.

The ID photo preparation processing is a processing to which the image processing method relating to the present invention is applied. Specifically, the ID photo preparation processing is realized by a CPU of a PC for image processing, which structures the image processing control section 58 and the first image processing section 56, executing a program for preparing the ID photo. Initially, the ID photo preparation program is stored in an information storage medium 68 (see FIG. 1). In FIG. 1, the information storage medium 68 is illustrated as a floppy disk, but the information storage medium 68 may be a CD-ROM or a memory card.

When the information storage medium 68 is loaded into an information reading device (not shown) which is built in the image processing PC, and transfer (installation) of the program from the information storage medium 68 to the image processing device 18 is designated, the ID photo preparation program is read out from the information storage medium 68 by the information reading device and then is stored in a HDD of the image processing PC. When a timing for effecting the ID photo preparation processing occurs, the ID photo preparation program is read out from the HDD and is executed by a CPU. Thus, the image processing device 18 acts as the image processing device relating to the present invention. The information storage medium 68 which stores the ID photo preparation program corresponds to a recording medium in the present invention.

In the ID photo preparation processing, firstly, in step 100, high-resolution image data of the image to prepare the ID photo is fetched from the fine-scanning memory 54 via the second image processing section 60. Next, in step 102, as shown in FIG. 4 for example, a screen for designating conditions for preparing the ID photo by using the image data fetched in step 100 is displayed.

Figure 4:
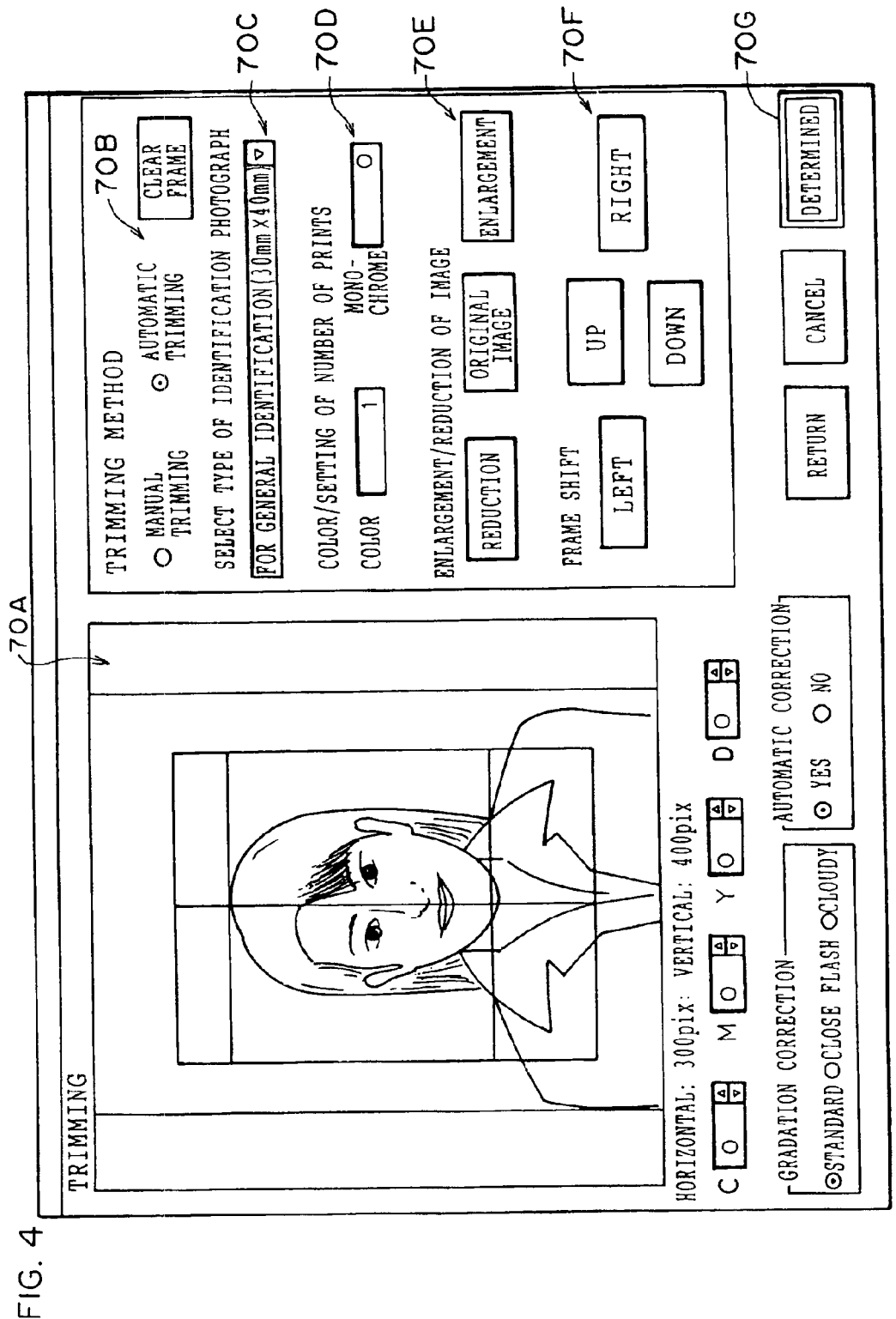
FIG. 4 is an imaginary view showing an example of a screen for designating conditions for preparing an ID photo.

The screen for designating the ID photo preparation conditions shown in FIG. 4 is provided with a display area 70A for displaying the image to prepare the ID photo, a selection field 70B for selecting whether designating of a trimming region is carried out manually or automatically, a selection field 70C for selecting a type (or size) of the ID photo to be prepared, an input field 70D for inputting the number of ID photos for each type (color/monochrome), a group of designation buttons 70E for designating enlargement/reduction of an image displayed on the display area 70A, a group of instruction buttons 70F for instructing shift of a position of the trimming region and a determination button 70G for determining the conditions for preparing the ID photo. Further, a selection field and an input field for adjusting an image quality of the ID photo are also provided.

In the present embodiment, a plurality of types of ID photos having different sizes with one another can be prepared. Identification photograph information in which "type (name)", "print size" and "overhead/face/below-jaw" (details thereof will be described later) are set for the various preparable ID photos is stored in the HDD, as shown in the following Table 1 (see FIG. 7). Among the ID photo information, "ratio of overhead/face/below-jaw" corresponds to "an appropriate value of size ratio", and "actual print size" corresponds to "information for specifying an aspect ratio of a trimming region". The HDD corresponds to the storage in the present invention.

TABLE 1

<CONTENTS OF IDENTIFICATION PHOTOGRAPH INFORMATION>

| TYPE | ACTUAL PRINT SIZE | RATIO OF OVERHEAD/FACE/BELOW-JAW |
|---|---|---|
| FOR GENERAL IDENTIFICATION | 30 mm × 40 mm | 1:5:2 |
| FOR PASSPORT | 35 mm × 45 mm | . . . |
| . . . | . . . | . . . |

In a state in which the screen for designating the ID photo preparation conditions is displayed on the CRT 20, the above-mentioned ID photo information can be referenced by a user clicking a right-hand button of the selection field 70C represented by "□". Then, the types (or names) of the ID photos which can be prepared are listed in the selection field 70C as choices.

In next step 104, whether or not an operator inputs any information by the key input section 64 (a keyboard and a mouse) is determined and the processing is placed in a waiting state until the determination of step 104 is affirmed. If any information is inputted, the answer to the determination in step 104 is affirmative and the process proceeds to step 106. In step 106, the contents of the inputted information is determined, and the processing is branched in accordance with results of the determination.

If the information which indicates that an operator has selected "automatic trimming" in the selection field 70B, the process proceeds to step 110. If the information which indicates that an operator has selected the determination button 70G, the process proceeds to step 112 (details thereof will be described later). If the information which indicates that an operator has selected operations other than such operations, the process proceeds from step 106 to step 108. In step 108, processings corresponding to the inputted information are implemented (for example, if the type of the ID photo to be prepared is selected, the type of the ID photo is stored. If the number of ID photos for each type is inputted, the number of the ID photos for each type is stored.) Then, the process returns to step 104.

Figure 3A:
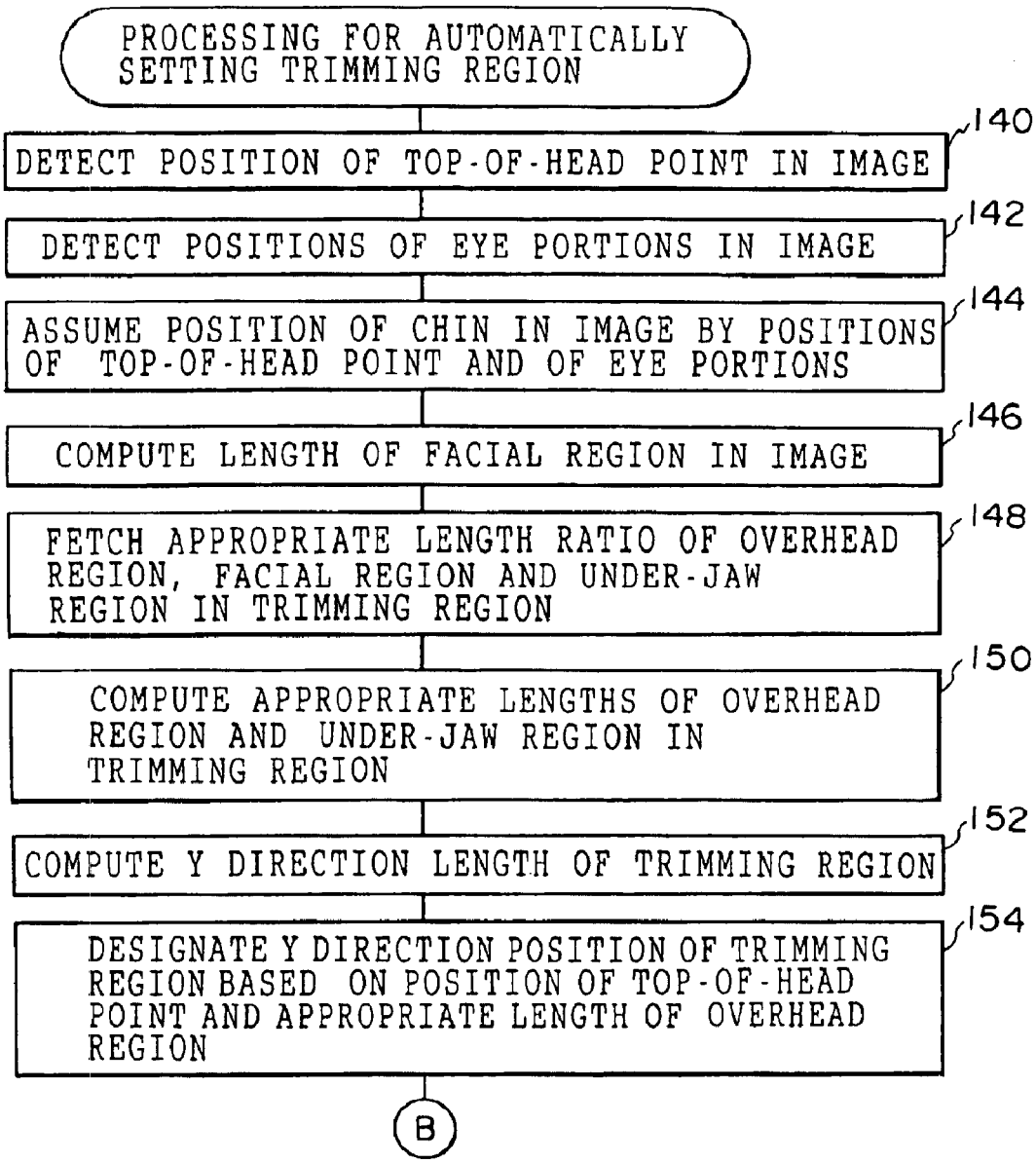

If the "automatic trimming" is selected by an operator in the selection field 70B, a processing for automatically designating trimming region is carried out in step 110. Hereinafter, the process for automatically designating trimming region will be described with reference to flowcharts of FIG. 3A and FIG. 3B. In step 140, a position of a point corresponding to the top portion of the head of a person in an image (hereinafter, simply referred to as a top-of-head point) is detected on the basis of the image data of the image to prepare the ID photo (an original image of the present invention). The position of the top-of-head point can be detected, for example, as follows.

Figure 5C:
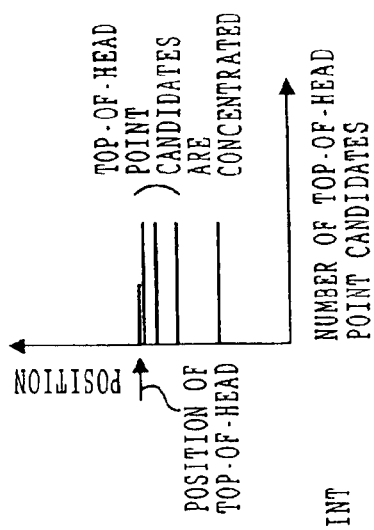
FIG. 5A through FIG. 5C are conceptional views for describing detection of a top-of-head point.
Figure 5B:
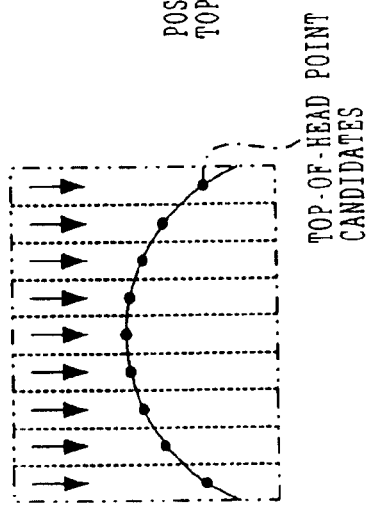
Figure 5A:
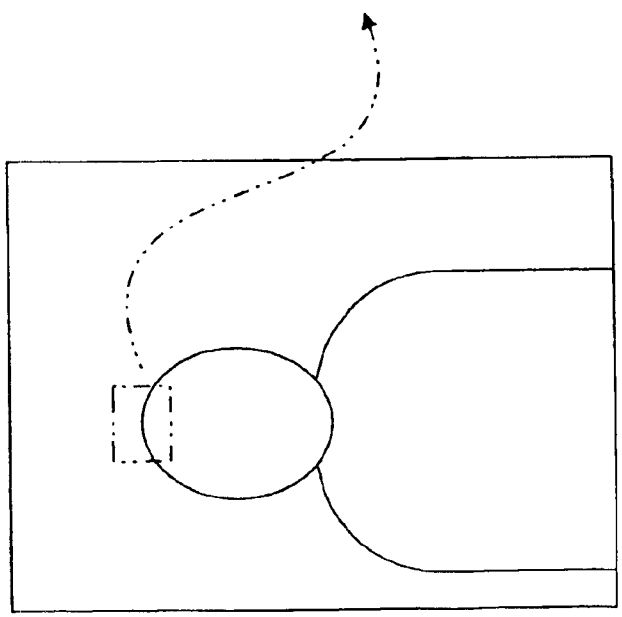

The image to prepare the ID photo (an example thereof is shown in FIG. 5A) is divided into a large number of elongated regions each of which has a certain width (corresponding to a few pixels), its longitudinal direction corresponding to a top-bottom (vertical) direction of a subject (person) in the image (A part of division lines is shown by broken lines in FIG. 5B). Each elongated region is scanned from the vertical direction upper side of the subject to the vertical direction lower side, and a density variation amount is computed repeatedly. A position at which the density variation amount first exceeds a predetermined value is stored as a proposed top-of-head point. Such operation is implemented for each of the respective elongated regions. Either a long side direction of the image or a short side direction thereof may be the vertical direction fixedly. The vertical direction may be detected by conventional techniques. Alternatively, the vertical direction may be determined by an operator. Hereinafter, the vertical direction is referred to as the Y direction and a horizontal direction perpendicular to the vertical direction is referred to as the X direction.

An interface position between a hair portion of the subject and a background is stored as a proposed top-of-head point for each elongated region with its division line being shown by a broken line in FIG. 5B. The proposed top-of-head point, positioned at the highest position in a portion included a large number of proposed top-of-head points along the Y direction, is designated as the top-of-head point. X and Y coordinates of the proposed top-of-head point are detected (see FIG. 5C, also). In this way, the top-of-head point in the image can be detected in a short time with high precision.

In step 142, on the basis of the image data of the image to prepare the ID photo, positions corresponding to eyes of the person in the image are detected. Firstly, an axis L which is shown by a broken line in FIG. 6A, parallel to the Y direction, and passes through the position of the top-of-head point detected in step 140 is determined. Then, a filtering processing is carried out by using a filter for detecting bright/dark patterns shown in FIG. 6E or 6F, for one side area (a left side area in FIG. 6A through FIG. 6D) with respect to the axis L. In this way, a first predetermined region A1 including an eye portion corresponding to a left eye is designated (see FIG. 6B).

As shown in FIG. 6G, a specific region N1 which is assumed to include an area corresponding to a pupil is designated at a central portion of the first determined region A1. A region N2 other than the specific region N1 is reversed from right to left (i.e., reversed with respect to a linear symmetrical axis parallel to the Y direction) and the reversed region is composited with the specific region N1. As a result, a template T shown in FIG. 6H is formed. Then, a search area E which is much larger than the template T is designated in the other side area (the right side area in FIG. 6A through FIG. 6D) with respect to the axis L (see FIG. 6C). The template T is scanned within the search area E and a correlation coefficient is computed repeatedly. The region having the largest correlation coefficient is designated as a second predetermined region A2.

The central coordinate value (X1, Y1) of the predetermined region A1 is designated as the position of the left eye. The central coordinate value (X2, Y2) of the predetermined region A2 is designated as the position of the right eye. Thus, positions of the eyes in the image can be detected in a short time with high precision.

Detection of positions corresponding to the eyes of a person in the image is not limited to the above-described algorithm. For example, the axis L is used to define a region to be processed at a time of designating the predetermined regions A1 and A2. An axis which does not pass the top-of-head point may be used as the axis L. Alternatively, the first predetermined region A1 may be designated without using the axis L by a filtering processing with the region to be processed being the entire image to prepare the ID photo. Then, the template T is formed. The second predetermined region A2 may be designated by scanning the template T within the search area designated in a vicinity of the first predetermined region A1.

In step 144, on the basis of the position of the top-of-head detected in step 140 (specifically, a Y coordinate value of the top-of-head point) and the positions of the eyes detected in step 142 (specifically, a Y coordinate value of one of the eyes or an average value of Y coordinate values of the eye portions), a Y coordinate value of the position corresponding to a chin of the person in the image is assumed. The present inventors have found empirically that a distance along the Y direction between the eye position and the chin position can be expressed at a certain ratio (e.g., about 2.1 times) with respect to a distance along the Y direction between the top-of-head position and the eye position.

The above-mentioned ratio found empirically is stored in the HDD. In step 144, on the basis of the distance along the Y direction between the top-of-head position and the eye position, and the aforementioned ratio, the distance along the Y direction between the eye position and the chin position is computed. The Y coordinate value which is shifted from the eye position by the computed distance is designated as the Y coordinate value of the chin position. The ratio may be changed by triggering operator's instructions or the like.

In step 146, a facial region corresponding to the face of the person in the image to prepare the ID photo is assumed to extend between the top-of-head position detected in step 140 and the chin position assumed in step 144. As the Y direction length of the facial region, a distance along the Y direction between the top-of-head position and the chin position (for example, a distance corresponding to the number of pixels on the image to prepare the ID photo) is computed.

In step 148, a Y direction length of the trimming region designated for the image to prepare the ID photo to prepare the ID photo is computed. "Overhead/face/below-jaw ratio" in the Table 1 shows a Y direction appropriate ratio of an overhead region which exists further upwards than the facial region in the trimming region and an under-jaw region which exists further downwards than the facial region in the trimming region. In the present embodiment, consideration is given for cases in which desired sizes (size ratios) of the facial region are different for types of the ID photos. Thus, "overhead/face/below-jaw ratio" is stored for each type of the ID photo. In step 148, the "overhead/face/below-jaw ratio" stored so as to correspond to a type of the ID photo selected on the screen for designating conditions for preparing ID photos is fetched. Based on the fetched ratio and the Y direction length of the facial region computed in step 146, the Y direction lengths of the overhead region and of the under-jaw region are computed. The Y direction length of the facial region, the Y direction length of the overhead region and the Y direction length of the under-jaw region are summed up to compute the total Y direction length of these regions.

In step 150, by computing, on the basis of the Y coordinate value of the top-of-head position and the Y direction length of the overhead region, an upper end position of the trimming region on the image to prepare the ID photo, or by computing, on the basis of the Y coordinate value of the chin position and the Y direction length of the under-jaw region, a lower end position of the trimming region on the image to prepare the ID photo, the Y direction position of the trimming region is designated. Thus, the position of the trimming region along the Y direction is designated such that the size ratio along the Y direction of the overhead region, the facial region and the under-jaw region within the trimming region coincides the appropriate ratio determined for each type of the ID photo.

In step 156, an aspect ratio of the trimming region corresponding to a type of the ID photo selected on the screen for designating conditions for preparing the ID photo is obtained. The aspect ratio of the trimming region is the same as the aspect ratio of the ID photo to be prepared. In step 156, "actual print size" corresponding to the type of the ID photo is fetched from the ID photo information stored in the HDD. The aspect ratio is computed from vertical and horizontal lengths of the ID photo represented by the fetched "actual print size". Thus, the aspect ratio of the trimming region is obtained.

In step 158, on the basis of the Y direction length of the trimming region computed in step 152 and the aspect ratio of the trimming region obtained in step 156, an X direction length of the trimming region is computed. In step 160, the average value of the X coordinate value of the left eye portion (=X1) and the X coordinate value of the right eye portion (=X2) computed in step 142, i.e., the coordinate value corresponding to the central portion of the eye portions along the X direction is computed.

In step 162, the position of the trimming region along the X direction is designated such that the central position along the X direction of the eye portions computed in step 160 coincides the center of the trimming region along the X direction. Thus, the X direction position of the trimming region is designated such that the facial region is positioned at a substantially center in the trimming region along the X direction.

The X direction position and length and the Y direction position and length of the trimming region are designated respectively. In step 164, a rectangular figure (hereinafter, referred to as a trimming frame) indicating an outline of the trimming region with its X direction position and length and Y direction position and length being designated is placed on the image to prepare the ID photo displayed within the display area 70A of the screen for designating conditions for preparing ID photos. Then, the process returns to step 104 in FIG. 2A and FIG. 2B.

If the "automatic trimming" is selected, the top-of-head position and the eye positions of the image to prepare the ID photo can be automatically detected, and the trimming region is designated automatically from the detected top-of-head position and the eye positions. Accordingly, a burden for an operator to prepare ID photos can be reduced. Further, the trimming frame is placed on the image to prepare the ID photo. Thus, an operator can check visually and easily whether the position and size of the displayed trimming frame (i.e., the trimming region designated by the processing for automatically designating the trimming region)is appropriate.

If it is determined that the position of the trimming region is not appropriate because the Y direction length of a region corresponding to the hair region of the person in the image is extremely large, an operator can instruct the position of the trimming frame (region) to be shifted by clicking any button of the instruction button group 70F. Change of the trimming frame (region) size maybe instructed by an operator dragging and dropping the displayed trimming frame. If the change of the position or size of the trimming frame (region) is designated, the process proceeds to step 108 via the steps 104 and 106. A processing for changing the position or size of the trimming region displayed in the display area 70A is implemented in accordance with the inputted information.

On the other hand, if it is determined that the position or size of the trimming frame displayed in the display area 70A is appropriate, an operator selects the determination button 70G. Then, the process proceeds to step 112 via the steps 104 and 106. In step 112, a message for inquiring an operator whether or not all images to be recorded as ID photos have been displayed on the CRT 20. On the basis of the information inputted by an operator in accordance with the message, it is determined whether or not all images have been designated.

In the present embodiment, plural kinds of ID photos can be prepared from a single image to prepare the ID photo. If plural kinds of ID photos are prepared, conditions for preparing ID photos including designating of the trimming region must be designated for each type. Among the plural kinds of ID photos to be prepared, if there are ID photos whose preparation conditions have not been designated, the answer to the determination in step 112 is negative, and the process returns to step 102. Then, an operation of step 102 and subsequent operations are repeated. If conditions for preparing ID photos including designating of the trimming frame have been designated with respect to all kinds of ID photos to be prepared, the answer to the determination in step 112 is affirmative, and the process proceeds to step 114.

In step 114, on the basis of the number of images to be recorded as the ID photo and the actual print size of each image, layout such as the position or direction of each image recorded in a recording frame (e.g., a frame having the same size as an L size photographic print) is designated. In step 116, as shown in FIG. 8, a layout confirmation screen for an operator to confirm the layout designated in step 114 is displayed on the CRT 20.

The layout confirmation screen shown in FIG. 8 is provided with a display area 72A for displaying a simulation image which represents how an image corresponding to an ID photo that a user asks to prepare is recorded on a photographic printing paper, a selection field 72B for adjusting a little a size of the image actually recorded on a photographic printing paper with respect to the actual print size corresponding to the selected ID photo type, a selection field 72C for selecting a distance between recorded ID photos (images), a selection field 72D for selecting changes of the arrangement order of images, selection field 72E for selecting types of text information to be printed with images and a print button 72F for designating print of images.

In step 116, data of an image region corresponding to the designated trimming region is extracted from the high-resolution image data of the image to prepare the ID photo. The extracted image data is enlarged or reduced in accordance with the actual print size. The image data is mounted on the same number of mount images (e.g., entirely white images) as the designated number of prints. (Images designated to be monochrome images are imparted to a monochrome finish before mounted.) Such operations are repeated for the number of types of ID photos to be prepared. In this way, image data for recording used for recording ID photos on a photographic printing paper is generated. A resolution of the generated image data for recording is made low so as to be displayed on the CRT 20, and the image data for recording is displayed as images on the display area 72A of the layout confirmation screen. Accordingly, an operator can easily understand how ID photos to be prepared are recorded on a photographic printing paper by visually observing images displayed on the display area 72A.

In step 118, whether or not an operator inputs any information is determined, and the process is placed in a waiting state until the determination of step 118 is affirmed. If an operator inputs any information, the answer to the determination in step 118 is affirmative, and the process proceeds to step 120. In step 120, contents of the inputted information is determined, and the process is branched in accordance with determination results. If information indicating that an operator selects one of choices displayed on the selection field 72E, the process proceeds to step 124.

Figure 9:
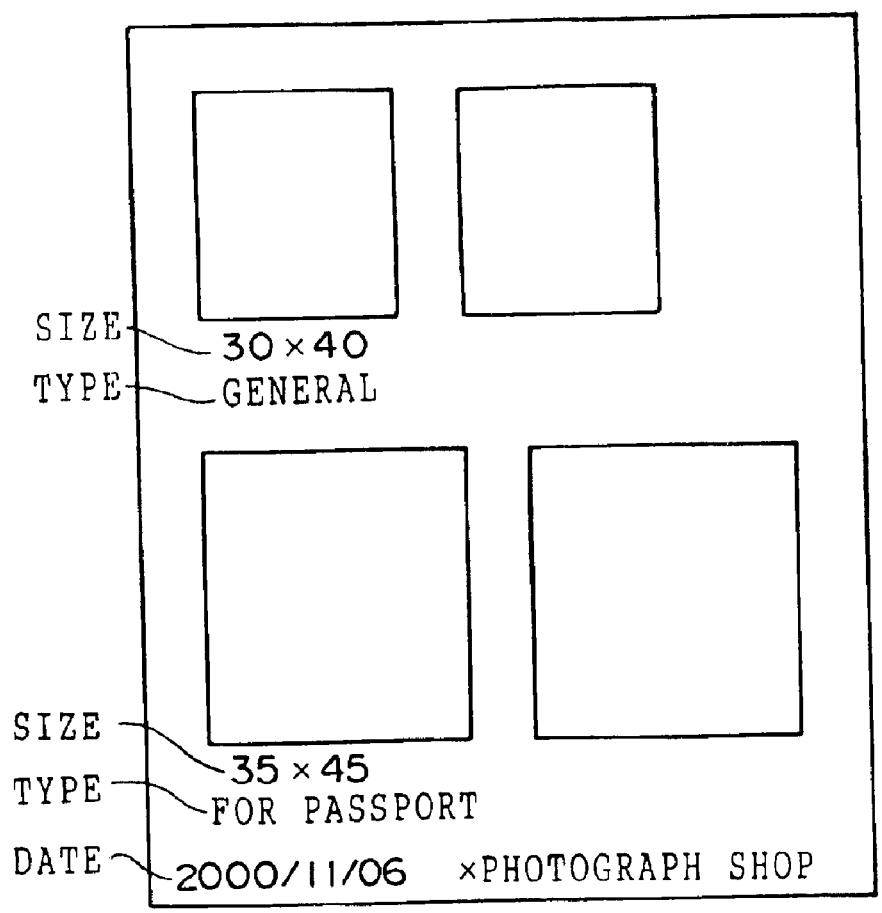
FIG. 9 is an imaginary view showing another example of text information which can be printed together with images for the ID photo.

The choices displayed on the selection field 72E represent types of text information which can be printed with images. In FIG. 8, for example, three kinds of choices, i.e., "date", "size" and "comments" are displayed as choices. In step 124, the text information selected by an operator is added to a predetermined position on images displayed on the display area 72A, and the process returns to step 118. The text information which indicates the date can be generated by obtaining date information from an operating system of the image processing PC. The text information which indicates the size can be obtained from ID photo information. The text information added optionally such as comments or the like may be set in a registry in the image processing PC or may be stored in the HDD. Thus, as shown in FIG. 8, an operator can visually confirm the added text information. As shown in FIG. 9, other text information including types of ID photos, a store name or the like may be printed.

If an operator designates any changes such as changes in sizes of images to be recorded, distance between images to be recorded or the arrangement order of images, the process proceeds to step 122 via steps 118 and 120. In step 122, a processing for changing images displayed on the display area 72A is implemented in accordance with an operator's instruction. If an operator selects the print button 72F, the process proceeds to step 126 via steps 118 and 120. In step 126, in order to record the same images as the images displayed on the display area 72A on a photographic printing paper, the image data for recording is generated again as described above.

In step 128, the image data for recording generated in step 126 is outputted to the laser printer 22 via the second image processing section 60 and the color reproduction conversion section 62. Thus, the same image as the image finally displayed on the display area 72A of the layout confirmation screen is exposed and recorded on a photographic printing paper by the laser printer 22, subjected to processings such as development and the like by a paper processor, and becomes visible. The ID photo can be obtained by cutting the image from a photographic printing paper with images recorded thereon at a predetermined size. In a case in which an operator designates to print the size or the like, as shown in FIG. 8, mistakes such as misreading of cut size of images do not occur because the text information indicating a determined size is printed in a vicinity of each image.

In the present embodiment, the trimming region is formed in a rectangular shape, but the present invention is not limited to such shape. Any shape may be used.

In the present embodiment, a case in which the present invention is applied to the image processing system 10 has been described, but the present invention is not limited to such case. The ID photo may be prepared with a printer connected to a user's PC by using image data obtained in the following manner. A user installs an ID photo preparation program to a PC at user's home and shoots a subject with an user's digital still camera. Alternatively, a user shoots a subject with an ordinary camera. Images in a photographic film are exposed, recorded and subjected processings to become visible. The images which have become visible are read by a scanner or the like.

In the present embodiment, preparation of ID photos has been described as an example, but the present invention is not limited to the example. The present invention can be applied to a case for preparing students' photographs in school albums.

As described above, in accordance with the present invention, a position corresponding to a top-of-head portion of a person in an original image and positions corresponding to eye portions are detected, on the basis of the position corresponding to the top-of-head portion of the person in the original image and the positions corresponding to the eye portions, a trimming region is designated such that a facial region corresponding to a face of the person is positioned at a predetermined position within the trimming region at a predetermined size ratio. Thus, the present invention has a superior effect that a burden of an operator can be lightened when designating the trimming region such that the facial region corresponding to the face of the person is positioned at the predetermined position within the trimming region at the predetermined size ratio.

What is claimed is:

1. An image processing apparatus comprising:
    a detector for detecting, on the basis of image data of an original image including facial region image data in which a face of a person is stored, a position corresponding to a top-of-head portion and positions corresponding to eye portions of the person in said original image; and
    a component for setting, on the basis of the detected positions corresponding to the top-of-head portion and the eye portions of the person in the original image, a trimming region for said original image to position said facial region at a predetermined position within the trimming region at a predetermined size ratio.

2. The image processing apparatus according to claim 1, further comprising;
    a storage for storing an appropriate value of a size ratio, along a vertical direction, of
        an overhead region, the overhead region being above said facial region along the vertical direction of a subject in the original image, said facial region, and
an under-jaw region, the under-jaw region being below said facial region along the vertical direction,
wherein said component for setting estimates, on the basis of the detected position corresponding to the top-of-head portion and the eye portions of the person in the original image, a position corresponding to a chin of the person in the original image, and, on the basis of a distance on the original image between the position corresponding to the top-of-head portion and the position corresponding to the chin, sets a position and a size of the trimming region along said vertical direction such that the size ratio along said vertical direction of said overhead region, said facial region and said under-jaw region in the trimming region matches the appropriate value of the size ratio stored in said storage.

3. The image processing apparatus according to claim 1, wherein said detector detects positions corresponding to both eye portions of the person in said original image, said storage stores information that represents an aspect ratio of the trimming region, and said component for setting sets a position corresponding to a substantial center along a horizontal direction perpendicular to said vertical direction in the positions corresponding to the eye portions as a central position of the trimming region along said horizontal direction, and on the basis of the size of the trimming region along said vertical direction, said component for setting sets a position and a size of the trimming region along said horizontal direction such that the aspect ratio of the trimming region matches the aspect ratio represented by the information stored in said storage.

4. The image processing apparatus according to claim 3 further comprising a selector for selecting a desired print size from many predetermined types of print sizes as a size of a recorded image when an image region corresponding to the set trimming region in the original image is recorded onto a recording material,
wherein said storage stores information that represents an appropriate value of said size ratio and an aspect ratio of said trimming region, with the appropriate value and the aspect ratio being corresponded to the many types of print sizes, and said component for setting sets the position and the size of the trimming region by using the information that represents the appropriate value of said size ratio and the aspect ratio corresponded to a print size selected by the selector and stored in the storage.

5. The image processing apparatus according to claim 1, further comprising:
a display controller for overlaying the trimming region set by said component for setting on the original image and displaying the same on a display; and
a corrector for correcting at least one of the position and the size of the trimming region set by said component for setting,
wherein when correction of at least one of the position and the size of the trimming region is instructed by said corrector, said component for setting corrects, in accordance with the instruction, at least one of the position and the size of the trimming region.

6. The image processing apparatus according to claim 1, further comprising:
a designator for designating text information to be recorded on a recording material; and
a recorder for recording, as an image onto a recording material, an image region corresponding to the trimming region in the original image set by said component for setting, and for recording the text information designated by said designator on the same recording material.

7. The image processing apparatus according to claim 6, wherein said text information is information that represents at least one of types of recorded images and print sizes with text.

8. An image processing method comprising the steps of:
(a) detecting, on the basis of image data of an original image including facial region image data that stores a face of a person, a position corresponding to a top-of-head portion and positions corresponding to eye portions of the person in said original image; and
(b) setting, on the basis of the detected positions corresponding to the top-of-head portion and the the eye portions of the person in the original image, a trimming region for said original image to position said facial region at a predetermined position within the trimming region at a predetermined size ratio.

9. The image processing method according to claim 8, further comprising the step of:
(c) storing an appropriate value of a size ratio, along a vertical direction, of
an overhead region, the overhead region being above said facial region along the vertical direction of a subject in the original image,
said facial region, and
an under-jaw region, the under-jaw region being below said facial region along the vertical direction,
wherein in said step (b), on the basis of the detected positions corresponding to the top-of-head portion and the eye portions of the person in the original image, a position corresponding to a chin of the person in the original image is estimated, and on the basis of the distance in the original image between the position corresponding to the top-of-head portion and the position corresponding to the chin, the position and the size of the trimming region along the vertical direction is set such that the size ratio along said vertical direction of said overhead region, said facial region and said under-jaw region in the trimming region matches the appropriate value of the size ratio stored in said step (c).

10. The image processing method according to claim 8, wherein in said step (a), the positions corresponding to the eye portions of the person in said original image are detected, in said step (c), information that represents an aspect ratio of the trimming region is stored and in step (b), a position corresponding to a substantial center along a horizontal direction perpendicular to said vertical direction in the positions corresponding to the eye portions detected in said step (a) is set as a central position of the trimming region along said horizontal direction, and on the basis of the size of the trimming region along said vertical direction, a position and a size of the trimming region along said horizontal direction is set such that the aspect ratio of the trimming region matches the aspect ratio represented by the information stored in said step (c).

11. The image processing method according to claim 10, further comprising the step of:
(d) selecting a desired print size from many predetermined types of print sizes as a size of a recorded image when an image region corresponding to the set trimming region in the original image is recorded onto a recording material,
wherein in said step (c), the information that represents an appropriate value of said size ratio and an aspect ratio of said trimming region is stored, with the appropriate value and the aspect ratio being corresponded to the many types of print sizes, and in said step (b), the position and the size of the trimming region is set by using the information that represents the appropriate value of said size ratio and the aspect ratio corresponded to a print size selected in said step (d) and stored in said step (c).

12. The image processing method according to claim 8, further comprising the steps of:
(e) overlaying the trimming region set in said step (b) on the original image and displaying the same on a display; and
(f) correcting at least one of the position and the size of the trimming region set in said step (b),
wherein in said step (b), when at least one of the position and the size of the trimming region is instructed to be corrected in said step (f), at least one of the position and the size of the trimming region is corrected in accordance with the instruction.

13. The image processing method according to claim 8, further comprising the steps of:
(g) designating text information to be recorded on a recording material; and
(h) recording, as an image onto a recording material, an image region in the trimming region in the original image set in said step (b) and recording the text information designated in said step (g) on the same recording material.

14. The image processing method according to claim 13, wherein said text information is information that represents at least one of types of recorded images and print sizes with text.

15. A recording medium having a program stored therein for causing a computer to effect processing, said processing comprises the steps of:
(a) detecting, on the basis of image data of an original image including facial image data that stores a face of a person, a position corresponding to a top-of-head portion and positions corresponding to eye portions of the person in said original image; and
(b) setting, on the basis of the detected position corresponding to the top-of-head portion and the eye portions of the person in the original image, a trimming region for said original image to position said facial region at a predetermined position with the trimming region at a predetermined size ratio.

16. The recording medium according to claim 15, wherein said processing further comprises the step of:
(c) storing an appropriate value of a size ratio, along a vertical direction, of
an overhead region, the overhead region being above said facial region along the vertical direction of a subject in the original image,
said facial region, and
an under-jaw region, the under-jaw region being below said facial region along the vertical direction,
wherein in said step (b), on the basis of the detected positions corresponding to the top-of-head portion and the eye portions of the person in the original image, a position corresponding to a chin of the person in the original image is estimated, and on the basis of the distance in the original image between the position corresponding to the top-of-head portion and the position corresponding to the chin, the position and the size of the trimming region along the vertical direction is set such that the size ratio along said vertical direction of said overhead region, said facial region and said under-jaw region in the trimming region matches the appropriate value of the size ratio stored in said step (c).

17. The recording medium according to claim 15, wherein in said step (a), the positions corresponding to the eye portions of the person in said original image are detected, in said step (c), information that represents an aspect ratio of the trimming region is stored and in step (b), a position corresponding to a substantial center along a horizontal direction perpendicular to said vertical direction in the positions corresponding to the eye portions detected in said step (a) is set as a central position of the trimming region along said horizontal direction, and on the basis of the size of the trimming region along said vertical direction, a position and a size of the trimming region along said horizontal direction is set such that the aspect ratio of the trimming region matches the aspect ratio represented by the information stored in said step (c).

18. The recording medium according to claim 17, wherein said processing further comprises the step of:
(d) selecting a desired print size from many predetermined types of print sizes as a size of a recorded image when an image region corresponding to the set trimming region in the original image is recorded onto a recording material,
wherein in said step (c), the information that represents an appropriate value of said size ratio and an aspect ratio of said trimming region is stored, with the appropriate value and the aspect ratio being corresponded to the many types of print sizes, and in said step (b), the position and the size of the trimming region is set by using the information that represents the appropriate value of said size ratio and the aspect ratio corresponded to a print size selected in said step (d) and stored in said step (c).

19. A recording medium according to claim 15, wherein said processing further comprises the steps of:
(e) overlaying the trimming region set in said step (b) on the original image and displaying the same on a display; and
(f) correcting at least one of the position and the size of the trimming region set in said step (b),
wherein in said step (b), when at least one of the position and the size of the trimming region is instructed to be corrected in said step (f), at least one of the position and the size of the trimming region is corrected in accordance with the instruction.

20. The recording medium according to claim 15, wherein said processing further comprises the steps of:
(g) designating text information to be recorded on the recording material; and
(h) recording, as an image onto a recording material, an image region in the trimming region in the original image set in said step (b) and recording the text information designated in said step (g) on the same recording material.

* * * * *